United States Patent
Rod et al.

[15] 3,694,497
[45] Sept. 26, 1972

[54] METHOD OF PREPARING AMMONIUM TEREPHTHALATE BY ISOMERIZATION, OR DISPROPORTIONATION OF POTASSIUM SALTS DERIVED FROM BENZENE-CARBOXYLIC ACIDS

[72] Inventors: Vladimir Rod; Vladimir Bazant; Zdenek Sir, all of Prague, Czechoslovakia

[73] Assignee: Ceskoslovenska akademie ved, Prague, Czechoslovakia

[22] Filed: Nov. 19, 1969

[21] Appl. No.: 878,266

[30] Foreign Application Priority Data

Nov. 22, 1968 Czechoslovakia..........8000-68

[52] U.S. Cl..............................................260/515 P
[51] Int. Cl.............................................C07c 63/28
[58] Field of Search ..................................260/515 P

[56] References Cited

UNITED STATES PATENTS 2,745,872  5/1956  Carlston et al. ...........260/515

Primary Examiner—James A. Patten
Attorney—Michael S. Striker

[57] ABSTRACT

Multiple-stage process of isomerizing, or disproportionating potassium salts derived from benzene-carboxylic acids, and ultimate processing of the reaction product containing more than 40 per cent by weight of the terephthalic component, to obtain ammonium terephthalate, wherein the raw reaction product is extracted by a filtrate left after refining precipitation of ammonium terephthalate by ammonia and carbon dioxide, which filtrate contains free ammonium ions and free ammonia. The thus arisen solid phase containing di-ammonium terephthalate is then separated from the reaction mixture, dissolved in water, the thus arisen solution being used, after separation of an insoluble residue, for the preparation of pure di-ammonium terephthalate.

4 Claims, No Drawings

METHOD OF PREPARING AMMONIUM TEREPHTHALATE BY ISOMERIZATION, OR DISPROPORTIONATION OF POTASSIUM SALTS DERIVED FROM BENZENE-CARBOXYLIC ACIDS

BACKGROUND OF THE INVENTION

The present invention relates to a method of preparing ammonium terephthalate by isomerization, or disproportionation of potassium salts derived from benzene-carboxylic acids, and by subsequently processing the reaction product containing more than 40 percent by weight of the terephthalic component. It is already known that in the preparation of terephthalic acid from benzoic acid by using the Henkel's method there is recovered a raw disproportionation product containing, apart from potassium salt of terephthalic acid, some colored substances based upon high molecular weight polycondensed aromatic compounds, further metallic compounds to be used as catalysts, or, eventually, corrosion products coming from reactor. From the aforementioned raw product a very pure terephthalic acid, or, eventually, ammonium terephthalic have to be recovered, which compounds are designed as starting materials for the preparation of glycol esters, and in further processing for the manufacture of polyester fibers. In this refining process it is advisable to separate potassium from the disproportionation product being in form of potassium salt of a weak acid so that the respective acid be displaced by benzoic acid whereby potassium benzoate may be recovered to be used as raw material for the disproportionation process. In this way the so-called potassium cycle can be accomplished, being object of a number of patent specifications or applications, such as German Pat. No. 1,063.593, U.S. Pat. No. 2,846.468, German Pat. No. 1,147.216, and Czechoslovak Pat. Applns. Nos. PV 3885-64, and PV 5574-67.

A common feature of all the methods as hereinbefore referred to is the first stage of processing the disproportionation product, consisting of dissolving potassium terephthalic contained therein, in water or in returned wash water filtrates, and the second stage comprising the separation of insoluble fractions containing polycondensed compounds and inorganic substances, such as catalysts. In this manner there can be recovered a potassium terephthalic solution having a low content of potassium salts of benzoic acid as well as of other benzene-carboxylic acids, which solutions will then be subject to further processing.

In accordance with the so-called ammonia process (SEE e.g. Japanese Pat. No. 23.486/61, and Czechoslovak Pat. Applns. Nos PV 5573-67, PV 5574-67 and PV 5575-67) which makes use of a reduction of ammonium terephthalic solubility, due to an ammonium ion excess, there is preferably used for precipitating ammonium terephthalic from said solution a direct saturation of the same with ammonia and carbon dioxide. Thus by the separation of the solid phase there is recovered from the starting solution ammonium terephthalic having a low content of potassium, a filtrate containing ammonium salts of carbonic acid, and preponderant potassium portion. In order to reduce the content of potassium as well as of contaminants in ammonium terephthalic below reasonable limit requested in view of further converting the same to fibers, the precipitating process should be repeated several times. The aforementioned refining will take a considerable part of manufacturing costs, since the processing of filtrates left after the aforesaid precipitating steps, from which it is recommendable to regenerate ammonia and carbon dioxide by desorption, lays extreme claims on power consumption.

The purpose of the present invention and the basic object of the same is to overcome the aforementioned disadvantages and to significantly improve the method of preparing ammonium terephthalic.

SUMMARY OF THE INVENTION

In accordance with one feature of our invention we provide a method of preparing ammonium terephthalic by isomerization, or disproportionation of potassium salt derived from benzene-carboxylic acids, and by subsequently processing the reaction product containing more that 40 percent by weight of the terephthalic component, which method comprises the steps of extracting the raw reaction product by a solution, such as a filtrate left after refining precipitation of ammonium terephthalic by ammonia and carbon dioxide, containing free ammonium ions and free ammonia, separating the thus arisen solid phase containing di-ammonium terephthalic, from the reaction mixture, dissolving said solid phase in water, and finally using the thus arisen solution, after separation of an insoluble residue, for the preparation of pure di-ammonium terephthalic phtalate.

An other feature of the method which is carried out as a multiple-stage process wherein the raw product of the disproportionating or isomerizing reaction is gradually added for the respective extracting solution at a temperature ranging from 10° to 60°Centigrade, consists in that in the extraction solution the ammonia concentration range is from 2.0 to 7.0 mol/kg, the terephthalic acid concentration range is from zero to 0.07 mol/kg, the molar concentration of ammonia to the molar concentration of carbon dioxide being in a ratio of from 1.3 to 4.1, the fluid/solid phase ratio ranging from 3:1 to 12:1. As results from the foregoing, the raw disproportionation product is freed from its preponderant potassium component in that it is suspended in a solution containing ammonium ions whereupon the solid phase is separated, and after the percolation thereof by water an ammonium terephthalic solution with low potassium content will be obtained. The aforementioned exchange of ammonium ion for potassium in the reaction product, without previous conversion into solution form, can be accomplished due to the structural configuration of said product which can be distinguished from pure di-potassium terephthalic in that the crystal lattice of the latter is distorted in this case by inherent contaminants so that this solid phase due to said lattice distortion, is unstable, getting quickly disintegrated in presence of water or aqueous solutions, dissolved, and in presence of highly concentrated ammonium ions immediately recrystallized in form of di-ammonium terephthalic which is more or less contaminated with potassium ions. On the contrary, if suspending analogously pure crystalline di-potassium terephthalic in the same solution, the exchange of potassium ions for ammonium ones occurs to such a small extent that in this case such an operation becomes practically reasonless (SEE the following EXAMPLE 9).

Unlike with well-known methods it is possible, in view of the low potassium content in starting solution, to get the required purity of ammonium terephthalic in a reduced number of precipitating steps. In the present process the amount of filtrates left after the separation of ammonium terephthalic is substantially reduced, which fact is very convenient from the economical view point.

For suspending the raw disproportionation product it is advantageous to use the filtrate left after the first step of precipitating ammonium terephthalic, which filtrate contains ammonium ions and a small amount of potassium ions only, apart from carbonate and carbamate ions, and which is saturated with terephthalic ions. In this suspending step an intensive potassium and ammonium ion exchange between liquid and solid phases takes place, which exchange results in a high-grade conversion of potassium terephthalic to ammonium terephthalic. Simultaneously, zinc, or, eventually, cadmium added to the raw disproportionation product get dissolved in the solution in form of a ammonium complex. In such a one-stage extracting process followed by the separation of the solid phase and the washing thereof by the starting extraction solution, it is possible, if maintaining the complex liquid/solid ratio of 8:1, to convert into solution more than 95 percent of potassium and more than 99 percent of zinc, or 97.5 percent of cadmium, respectively, from the total amount of the disproportion product. Inasmuch as the extraction solution is saturated with terephthalic ions, the yield of terephthalic acid in the solid phase amounts to almost 100 percent. The efficiency of separating potassium and zinc can further be enhanced by multistep crosswise or counterflow arrangement of the extraction. The solid phase separated after extraction contains almost all colored contaminants present in the starting product so that as small portion thereof enters the solution only as it is possible to subject the solution, without further purification, to desorption, neutralization by benzoic acid and to drying to obtain potassium benzoate which, due to its characteristics, is suitable for the disproportionation.

By dissolving the filter cake in water and by filtering the solution arisen after addition of some filtering media, such as active carbon, therewill be obtained a colorless filtrate suitable for the subsequent preparation of ammonium terephthalic. To prevent the aforesaid colored contaminants from penetrating into perculating water during the washing of the filter cake left after filtration, it is advisable to use as wash water a weak electrolyte.

The following examples are given as illustrative only without, however, limiting the invention to the specific details thereof.

EXAMPLE 1

To 4.5 kg of a solution containing 6.8 per cent by weight of $NH_3$ (4 mol/kg) and 13.6 percent by weight of $CO_2$ (3.1 mol/kg) and prehetaed to 50°Centigrade there was added under thorough agitation successively within about 20 minutes 1.5 kg of raw disproportionation product containing 55.5 percent by weight of terephthalic acid(in form of potassium salt), 30.3 percent by weight of potassium and 5.6 percent by weight of insoluble colored organic substances. The weight ratio of terephthalic acid to potassium in the starting product was 1.84:1. The mixture was then cooled under steady agitation to 20°Centigrade, the solid phase sucked off over over vacuum filter and the residue left on the filter washed by three doses of the same solution, one kg each, which solution was used for the extraction. There was obtained 2.4 kg of a wet cake 50.5 per cent dry solid content at 60°Centigrade) containing 30.5 percent by weight of terephthalic acid, 6.1 percent by weight of potassium, 3.3 percent of organic colored substances (weight ratio of terephthalic acid to potassium equalling 5.3:1) and 6.6 kg of filtrate containing 1.6 percent by weight of terephthalic acid and 4.8 percent by weight of potassium (weight ratio of terephthalic acid to potassium being 0.33:1). The distribution between the filter cake and the filtrate with terephthalic acid was in a ratio of 6.9:1, with potassium 0.43:1.

EXAMPLE 2

To 18 kg of a solution containing 11.9 percent by weight of $NH_3$ (7 mol/kg) and 7.5 percent by weight of $CO_2$ (1.7 mol/kg) and preheated to 40°Centigrade there was added under intensive agitation successively within about 20 minutes 1.5 kg of raw disproportionation product of the same composition as referred to in EXAMPLE 1. The mixture was then cooled under steadily agitation to 20°Centigrade, the solid phase sucked off over vacuum filter and the residue on the filter washed by three doses of the same solution, 1 kg each, which solution was used for the extraction. There was obtained 2.1 kg of a wet cake (58 percent dry solid content at 60°Centigrade) containing 35.5 percent by weight of terephthalic acid, 1.2 percent by weight of potassium and 3.7 percent of organic colored substances (weight ratio terephthalic acid/potassium being 29.5:1) as well as 20.4 kg of a filtrate containing 0.45 percent of terephthalic acid and 2.1 percent by weight of potassium (weight ratio terephthalic acid/potassium being 0.2:1). The distribution between filter cake and filtrate was in a ratio of 8.1:1 with terephthalic acid and 0.06:1 with potassium.

EXAMPLE 3

To 11.25 kg of a solution containing 11 percent by weight of $NH_3$ (6.5 mol/kg) and 14.3 percent by weight of $CO_2$ (3.25 mol/kg) and preheated to 40°Centigrade there was added under steady agitation successively within about 20 minutes 1.5 kg of raw disproportionation product having the same composition as referred to in EXAMPLE 1. After having been cooled to 20°Centigrade the solid phase was separated over vacuum filter and washed by three 1 kg doses of the same solution as used for the extraction. There was obtained 2.06 kg of a wet cake (61.5 percent dry solid content at 60°Centigrade) containing 37.0 percent of terephthalic acid, 0.7 percent by weight of potassium, 3.9 percent of organic colored substances (terephthalic acid/potassium weight ratio being 51.5:1 and 13.69 kg of a filtrate containing 0.5 percent by weight of terephthalic acid and 3.2 percent of potassium (weight ratio terephthalic acid/potassium being 0.16:1). The distribution between filter cake and filtrate was in a ratio of 11:1 with terephthalic acid and 0.03:1 with potassium.

EXAMPLE 4

To 11.25 kg of a solution containing 3.4 percent by weight of $NH_3$ (2 mol/kg) and 4.4 percent by weight of $CO_2$ (1 mol/kg) there was added at a temperature of 10°Centigrade under intensive agitation successively within about 20 minutes 1.5 kg of raw disproportionation product having the same composition as referred to in EXAMPLE 1. The solid phase was separated over vacuum filter and washed by three doses of the same solution, one kg each, which solution was used for the extraction, the temperature of 10°Centigrade being maintained permanently. There was obtained 2.15 kg of a wet cake (54 percent dry solid content at 60°Centigrade) containing 31.6 percent by weight of terephthalic acid, 2.2 percent by weight of potassium, 3.7 percent of humins (weight ratio of terephthalic acid/potassium being 14.4:1) and 13.6 kg of a filtrate containing 1.1 percent by weight of terephthalic acid and 3.0 percent by weight of potassium (weight ratio of terephthalic acid/potassium being 0.36:1). The distribution between filter cake and filtrate was in a ratio of 4.5:1 with terephthalic acid and 0.12:1 with potassium.

EXAMPLE 5

To 11.25 kg of a solution containing 11.9 percent by weight of $NH_3$ (7 mol/kg) and 15.4 percent by weight of $CO_2$ (3.5 mol/kg) and preheated to 60°Centigrade there was added successively under steadily agitating within about 20 minutes 1.5 kg of raw disproportionation product of the same composition as referred to in EXAMPLE 1. The mixture was cooled to 20°Centigrade and the solid phase then separated over vacuum filter and finally washed by three one kg doses of the same solution as used for the extraction. There was obtained 2.0 kg of a wet cake (63.9 percent dry solid content at 60°Centigrade) containing 39.1 percent of terephthalic acid, 0.6 percent of potassium, 4.0 percent of organic colored substances (weight ratio of terephthalic acid(potassium being 72:1) and 13.75 kg of a filtrate containing 0.4 percent by weight of terephtalic acid and 3.25 percent by weight of potassium terephthalic acid/potassium weight ratio being 0.12:1). The distribution between filter cake and filtrate was 15:1 with terephthalic acid and 0.03:1 with potassium.

EXAMPLE 6

To 6.0 kg of a solution containing 11 percent by weight of $NH_3$ (6.5 mol/kg) and 14.3 percent by weight of $CO_2$ (3.25 mol/kg) and preheated to 40°Centigrade there was admixed successively under steadily agitating within about 20 minutes 1.5 kg of raw disproportionation product having the same composition as set forth in EXAMPLE 1. The solid phase once cooled to 20°Centigrade was separated over vacuum filter and washed by three 1 kg doses of the same solution which was used for the extraction. There was obtained 2.1 kg of a wet cake (61.5 percent dry solid content at 60°Centigrade) containing 37.0 percent of terephthalic acid, 1.4 percent of potassium, 3.8 percent of organic colored substances (terephthalic acid/potassium weight ratio being 26.5:1) and 8.4 kg of a filtrate containing 0.7 percent by weigh of terephthalic acid and 5.1 percent of potassium (terephthalic acid/potassium weight ratio being 0.14:1). The distribution between filter cake and filtrate was in ratio of 13:1 with terephthalic acid and 0.07:1 with potassium.

In the second step the cake from the first precipitating step was dispersed under steady agitation again at 40°Centigrade in 6.0 kg of the same solution as used in the first step. Also the further procedure was the same as described. There was obtained 1.95 kg of a filter cake (63.5 percent dry solid content at 60°Centigrade) containing 37.5 percent of terephthalic acid, 0.25 percent of potassium, 4.1 percent of organic colored contaminants (terephthalic acid/potassium weight ratio being 150:1) and 9.15 kg of a filtrate containing 0.5 percent of terephthalic, acid and 0.27 percent of potassium (terephthalic acid/potassium weight ratio being 1.9:1). The distribution between filter cake and filtrate in the second step was in a ratio of 17:1 with terephthalic acid and 0.2:1 with potassium, totally in the two steps 7.1:1 with terephthalic acid and 0.01:1 with potassium.

EXAMPLE 7

To 11.0 kg of the filtrate obtained in the first step of precipitating di-ammonium salt of terephthalic acid from a raw ammonium terephthalic solution by means of ammonia and carbon dioxide, and containing 11.8 percent by weight of $NH_3$ (7 mol/kg), 16.2 percent by weight of $CO_2$ (3.7 mol/kg), 0.5 percent by weight of terephthalic acid (0.03 mol/kg) and 0.02 percent by weight of $K^+$ (0.005 mol/kg) there was successively dosed under steadily agitating within about 20 minutes 1.5 kg of raw disproportionation product having the same composition as referred to in EXAMPLE 1. The mixture was then cooled under agitation to about 20°Centigrade, the solid phase sucked off over vacuum filter and the filter cake washed by three 1 doses of the same solution as used for the extraction. There was obtained 2.1 kg of a wet cake (52.5 percent dry solid content) containing 39.1 percent by weight of terephthalic acid, 0.8 percent by weight of potassium, 3.9 percent by weight of organic colored substances (terephthalic acid/potassium weight ratio being 49.2:1) and 13.4 kg of a filtrate containing 0.5 percent of terephtalic acid and 3.3 percent of potassium (terephthalic acid/potassium weight ratio being 0.18:1). The distribution between filter cake and filtrate was in a ratio of 10.1:1 with terephthalic acid and of 0.04:1 with potassium. 2.0 kg of the filter cake from the preceding operation was added to 11.0 kg of hot water and the mixture heated up to about 90°Centigrade. After admixing a filtering medium, as e.g. active carbon, the mixture was rapidly cooled to 20°Centigrade and an insoluble residue sucked off over vacuum filter. There was obtained 12.7 kg of a clear colorless filtrate containing 6.2 percent by weight of terephthalic acid and 0.13 percent by weight of potassium. The filtrate was then used as feedstock for a plant for preparing chemically pure di-ammonium terephthalic in a process of precipitating by ammonia and carbon dioxide.

13.0 kg of the filtrate from the firstmentioned step was freed by ebullition from ammonia and carbon dioxide excess. To the boiled liquid 1.22 kg of benzoic acid was added and the mixture evaporated until dry. There was obtained 1.87 kg of raw material for the disproportionation, containing 86.0 percent by weight of potassium benzoate and 6.6 percent by weight of di-potassium terephthalic.

EXAMPLE 8

To 9 kg of a solution containing 46.3 percent by weight of ammonium sulphate (3.5 mol/kg) and 1.7 percent by weight of ammonia (1 mol/kg) there was neing added at the temperature of 40°Centigrade during about 20 minutes under thorough agitation 1.5 kg of the raw product of the disproportionating reaction, which product had the same composition as referred to in the precedent EXAMPLE 1. The solid phase once cooled to 20°Centigrade was separated over a vacuum filter and rinced successively in three one kg batches of 1.7 percent by weight ammonia solution precooled to 10°Centigrade. The result was 2.08 kg of a wet cake (63 percent of dry solid content at 60°Centigrade) containing 38.1 percent by weight of terephtalic acid, 1.15 percent by weight of potassium and 3.5 percent by weight of colored organic substances (terephthalic acid/potassium weight ratio having been 33.3:1) and 11.42 kg of a filtrate containing 0.35 percent by weight of terephthalic acid and 3.78 percent by weight of potassium (terephthalic acid/potassium weight ratio having been 0.1:1). The ratio of distribution of terephthalic acid between the filter cake and the filtrate was 20:1, while in case of potassium 0.05:1.

EXAMPLE 9

To 11.25 kg of a solution containing 11 percent by weight of ammonia (6.5 mol/kg) and 14.3 percent by weight of carbon dioxide (3.25 mol/kg), which solution was preheated to 40°Centigrade, there was being uniformly added during about 20 minutes under thorough agitation 1.23 kg of potassium terephtalate having average grain size of 0.5 millimeters (the total terephtalic acid volume having corresponded to that from EXAMPLE 3). The solid phase once cooled to 20°Centigrade was separated over a vacuum filter and rinced successively in three 1 kg batches of the same solution as employed for the extraction. There was obtained 1.6 kg of a wet cake (85 percent dry solid content at 60°Centigrade) containing 49.2 percent by weight of terephthalic acid and 9.5 percent by weight of potassium (terephthalic acid/potassium weight ratio having been 5.2:1) and 13.87 kg of a filtrate containing 2.37 percent by weight of terephthalic acid and 1.7 percent by weight of potassium (terephthalic acid/potassium weight ratio having been 0.22:1). The ratio of distribution of terephthalic acid between the filter cake and the filtrate equalled 15.5:1, while in case of potassium 0.65:1.

Without further analysis, the foregoing will so fully reveal the gist of the present invention that others can by applying current knowledge readily adapt it for various applications without omitting features that, from the stand point of prior art fairly constitute essential characteristics of the generic and specific aspects of this invention and, therefore such adaptations should be and are intended to be comprehended within the meaning and range of equivalence of the following claims.

What is claimed as new and desired to be protected by Letters Patent is set forth in the appended claims:

1. Method of preparing ammonium terephthalate from the crude product, obtained by isomerization of the potassium salts of phthalic and/or isophthalic acids or by the disproportionation of potassium benzoate at elevated temperatures in the presence of a catalyst, said crude products containing in addition to more than 40 percent by weight of potassium terephthalate, high molecular weight condensation products, metallic impurities, etc. comprising the steps of 1 extracting said impure reaction product with a solution containing ammonium ions and free ammonia whereby there is formed a solid phase containing diammonium terephthalate, 2 separating said solid phase off from the extraction mixture, 3 dissolving said solid phase containing diammonium terephthalate in water, and 4 recovering from the resulting solution following separation of any insoluble residue present therein, substantially pure diammonium terephthalate.

2. Method according to claim 1 wherein said solution used in step 1) for said extracting is the filtrate obtained from the refining precipitation of ammonium terephthalate with ammonia and carbon dioxide.

3. Method according to claim 1 wherein said solution used in step 1 for said extracting contains ammonia in an amount of from 2.0 – 7.0 mol/kg, terephthalic acid in an amount of from 0 – 0.07 mol/kg, the molar ratio of ammonia to carbon dioxide amounting to from 1.3 – 4.1, the fluid-solid phase ratio amounting to from 3:1 – 12:1 and wherein said temperature in step 2 amounts to from 10° – 60°C.

4. Method according to claim 1 wherein the filtrate remaining after step 2 is at least in part used for the preparation of potassium benzoate.

* * * * *